(12) United States Patent
Folea et al.

(10) Patent No.: US 8,442,225 B2
(45) Date of Patent: May 14, 2013

(54) METHOD AND SYSTEM FOR THE SECURED DISTRIBUTION OF AUDIOVISUAL DATA BY TRANSACTION MARKING

(75) Inventors: Octavian Folea, Le Kremlin-Bicêtre (FR); Sébastien Dupuis, Paris (FR); Pierre Sarda, Eaubonne (FR)

(73) Assignee: Nagra France, Paris (FR)

( * ) Notice: Subject to any disclaimer, the term of this patent is extended or adjusted under 35 U.S.C. 154(b) by 610 days.

(21) Appl. No.: 12/517,490

(22) PCT Filed: Dec. 5, 2007

(86) PCT No.: PCT/FR2007/001999
§ 371 (c)(1),
(2), (4) Date: Jan. 15, 2010

(87) PCT Pub. No.: WO2008/081113
PCT Pub. Date: Jul. 10, 2008

(65) Prior Publication Data
US 2010/0128871 A1    May 27, 2010

(30) Foreign Application Priority Data

Dec. 5, 2006 (FR) ...................... 06 55315

(51) Int. Cl.
*H04N 7/167* (2011.01)
(52) U.S. Cl.
USPC ............. 380/210; 380/28; 380/279; 713/170
(58) Field of Classification Search ............. 380/28, 380/30
See application file for complete search history.

(56) References Cited

U.S. PATENT DOCUMENTS

| 2002/0026636 | A1  | 2/2002  | LeComte |
| 2002/0162000 | A1* | 10/2002 | Benzler ........................ 713/170 |
| 2004/0125959 | A1* | 7/2004  | Beuque et al. ................ 380/279 |
| 2004/0249962 | A1  | 12/2004 | Lecomte |

(Continued)

FOREIGN PATENT DOCUMENTS

| FR | 2 812 147 A1 | 1/2002 |
| FR | 283 5387 A1  | 8/2003 |

(Continued)

OTHER PUBLICATIONS

"Protecting VoD the Easier Way." ACM Multimedia '98, Bristol, UK © 1998 ACM 1-58113-036-898/0008.

*Primary Examiner* — Nathan Flynn
*Assistant Examiner* — Phuoc Tran
(74) *Attorney, Agent, or Firm* — Harness, Dickey & Pierce P.L.C.

(57) ABSTRACT

The application relates to a method for distributing a marked audiovisual sequence from a nominal audiovisual sequence, said nominal audiovisual sequence having a nominal content, wherein
a first modified flow having a modified content different from the nominal content is generated, and
a second marked complementary flow including marked complementary digital information is generated;
said first modified flow and said marked complementary information are transmitted, so as to allow the restoration of said marked audiovisual sequence at the receiving item of equipment;
an operation of marking said nominal audiovisual sequence is carried out, so as to determine a marked audiovisual sequence having a marked content;
a difference is determined between said marked content, on the one hand, and said modified content or said nominal content, on the other hand;
wherein said marked complementary digital information depend on said difference.

13 Claims, 3 Drawing Sheets

U.S. PATENT DOCUMENTS

| | | | |
|---|---|---|---|
| 2005/0084018 A1 | 4/2005 | LeComte | |
| 2005/0111558 A1 | 5/2005 | Lecomte | |
| 2005/0155073 A1 | 7/2005 | Lecomte | |
| 2005/0185793 A1 | 8/2005 | LeComte et al. | |
| 2005/0185821 A1 | 8/2005 | LeComte et al. | |
| 2005/0193019 A1 | 9/2005 | LeComte | |
| 2005/0193409 A1 | 9/2005 | LeComte et al. | |
| 2005/0213760 A1 | 9/2005 | LeComte et al. | |
| 2005/0243924 A1 | 11/2005 | Lecomte et al. | |
| 2005/0281471 A1 | 12/2005 | LeComte | |
| 2005/0283811 A1 | 12/2005 | LeComte | |
| 2005/0289063 A1 | 12/2005 | LeComte et al. | |
| 2005/0289064 A1 | 12/2005 | LeComte et al. | |
| 2006/0002552 A1 | 1/2006 | LeComte et al. | |
| 2006/0066625 A1 | 3/2006 | LeComte et al. | |
| 2006/0072559 A1 | 4/2006 | LeComte et al. | |
| 2006/0150233 A1 | 7/2006 | LeComte et al. | |
| 2006/0164544 A1 | 7/2006 | Lecomte et al. | |
| 2006/0167682 A1 | 7/2006 | Lecomte et al. | |
| 2006/0182278 A1 | 8/2006 | Lecomte et al. | |
| 2006/0184686 A1 | 8/2006 | Lecomte et al. | |
| 2006/0195875 A1 | 8/2006 | LeComte | |
| 2006/0210075 A1 | 9/2006 | LeComte et al. | |
| 2006/0215875 A1 | 9/2006 | LeComte et al. | |
| 2006/0216003 A1 | 9/2006 | LeComte et al. | |
| 2007/0165842 A1* | 7/2007 | Lecomte et al. | 380/28 |
| 2007/0189531 A1 | 8/2007 | Lecomte et al. | |
| 2007/0195953 A1 | 8/2007 | Lecomte et al. | |
| 2008/0031326 A1 | 2/2008 | Lecomte et al. | |
| 2008/0263611 A1 | 10/2008 | Lecomte | |
| 2009/0070886 A1 | 3/2009 | Lecomte et al. | |

FOREIGN PATENT DOCUMENTS

| | | |
|---|---|---|
| FR | 2853786 A1 | 10/2004 |
| FR | 2860122 A1 | 3/2005 |
| WO | WO-2004/062281 A2 | 7/2004 |
| WO | WO-2004/073311 A1 | 8/2004 |
| WO | WO-2004/084523 A1 | 9/2004 |

\* cited by examiner

METHOD AND SYSTEM FOR THE SECURED DISTRIBUTION OF AUDIOVISUAL DATA BY TRANSACTION MARKING

CROSS-REFERENCE TO RELATED APPLICATIONS

This application is a National Phase Entry of International Application No. PCT/FR2007/001999, filed Dec. 5, 2007, which claims priority to French Patent Application No. 06/55315, filed Dec. 5, 2006, both of which are incorporated herein by reference.

BACKGROUND AND SUMMARY

The invention relates to a method for distributing audiovisual sequences.

In order to protect an audiovisual sequence against hacking, it is known to tattoo the audiovisual sequence in a visible or invisible way, so as to identify the holder of a pirated copy. It is also known to encipher the audiovisual sequence during a transmission in order to prevent the illegal playing of the sequence. Of course, it is possible to combine the two protection methods by enciphering the audiovisual sequence at the level of an enciphering module on the transmitting side and by tattooing the sequence after the deciphering at the level of a tattooing module on the receiving side. However, such a method would not prevent a fraudor from retrieving the sequence at the output of the deciphering module prior to the passage thereof at the tattooing module. Such a fraudor could then freely use the non tattooed audiovisual sequence if he or she could decipher the sequence.

In order to solve this general problem, a method is known for distributing a marked audiovisual sequence from a nominal audiovisual sequence to a receiving item of equipment, said nominal audiovisual sequence having a nominal content, the method including steps wherein:
  a first modified flow having a modified content different from the nominal content is generated, and
  a second marked complementary flow including marked complementary digital information is generated;
  said first modified flow and said marked complementary information are transmitted to the receiving item of equipment so as to allow the restoration of said marked audiovisual sequence at the receiving item of equipment.

Such a method is known from the application WO 2004/062281. In one embodiment of this application, the complementary flow includes marking instructions intended to insert an invisible and customized mark into the marked audiovisual sequence. In a preferred embodiment of the application WO 2004/062281, these instructions more particularly make it possible to reverse the LSB of some visual coefficients, such as the DC coefficients. The absence or not of a reversion on an LSB will make it possible to determine the first mark inserted into the audiovisual sequence during an identification step. With such instructions being inserted into the complementary flow, a fraudor could not have access to the audiovisual content prior to the application of the marking instructions and thus prior to the insertion of the first customized mark.

However, this type of method cannot be used in combination with known tattooing or marking devices. As a matter of fact, in the above-mentioned application, the elements contained in the marked complementary information enabling the marking of said audiovisual sequence contain instructions which are specific to the marking operation: reversion of the LSB of some visual coefficients. Marking instructions are thus predefined so that it is not possible to mark the audiovisual sequence using a standard marking device thus generating a priori unknown marking information.

Following the above-mentioned document, a problem that the invention intends to solve is thus to facilitate the marking of the audiovisual sequence. Another problem which the invention intends to remedy consists in allowing the marking of an audiovisual sequence while allowing the utilization of any type of marking device or without knowing the marking information beforehand. Such problems are solved by the invention which relates to a method such as described hereabove, wherein the step during which the second mark complementary flow is generated, includes steps wherein:
  an operation of marking of said nominal audiovisual sequence is carried out so as to determine a marked audiovisual sequence having a marked content;
  a difference between the marked content, on the one hand, and said modified content or said nominal content, on the other hand, is determined; said marked complementary digital information depending on said difference.

Thus, according to the invention, using the difference between, on the one hand, the marked content and the modified content or the nominal content, on the other hand, it is possible to determine what mark has been applied to the nominal audiovisual sequence during the marking operation, while transmitting data enabling the restoration of the marked audiovisual sequence in a secure way. Thus, it is possible to transmit one securely marked audiovisual sequence without knowing a priori the marking information and thus from any tattooing device.

According to one embodiment of the invention, the step consisting in determining a difference between said nominal content and said modified content includes steps wherein:
  a second modified complementary flow comprising complementary digital information capable of allowing the restoration of the nominal content from the modified content is generated,
  at least a piece of marking information is determined as a function of the bit differences between the marked content and the nominal content;
  said marked complementary digital information are determined as a function of said complementary information and said marking information.

This embodiment has the advantage of being implemented on a known protection module. In this embodiment, said marking information, said complementary information and said marked complementary information can have an identical format. This more particularly makes it possible to make the transmission method even safer.

Besides, in one embodiment, the step consisting in generating said second marked complementary flow includes steps wherein:
  a second modified complementary flow comprising complementary digital information capable of allowing the restoration of the nominal content from the modified content is generated,
  marking information are determined so as to enable the restoration of said marked audiovisual sequence from said nominal audiovisual sequence, said marking information being determined further to the operation of marking said nominal audiovisual sequence;
  said marked complementary digital information are determined as a function of said complementary information and said marking information, wherein said marking information, said complementary information and said marked complementary information have an identical format.

According to another embodiment of the invention, the step consisting in determining a difference between said marked content and said modified content includes steps wherein:

said marked content and said modified content are compared at the bit level so as to determine said difference. This more particularly makes it possible to easily obtain the difference between the marked content and the modified content.

In order to obtain a marked audiovisual sequence which is also customized, said marked complementary information may include a customization identifier. This customization identifier can include a single identifier of said receiving item of equipment and/or a single identifier of a user of said receiving item of equipment, and/or a single identifier of said marking operation. This makes it a customization of the marked content possible as a function of the selected identifier and by possibly using an identifier database. The marking according to the invention can thus include a tattooing and a customization.

In order to improve the protection of the audiovisual sequence against possible fraudors, said marked complementary digital information can include information relating to digital rights associated with the nominal audiovisual sequence. Said marked complementary information include a tattoo so that said marked content is visually and aurally identical to the nominal content, so that possible fraudors will not be able to detect the marking and so that an authorized user will not be disturbed in the consumption of said marked audiovisual sequence. Said nominal audiovisual sequence has a nominal format wherein said modified content has a format identical with said nominal format, so that a user can have access to some information of the nominal audiovisual sequence without being able to consume this sequence in a satisfactory way without a particular authorization.

The invention also relates to a system for distributing a marked audiovisual sequence from a nominal audiovisual sequence to a receiving item of equipment, said nominal audiovisual sequence having a nominal content,
the system including:
means capable of generating a first modified flow having a modified content different from the nominal content, and
means capable of generating a second marked complementary flow including marked complementary digital information;
means capable of transmitting to the receiving item of equipment said first modified flow and the marked complementary information, so as to allow the restoration of said marked audiovisual sequence at the level of the receiving item of equipment;
the system being characterised in that the means for generating a second marked complementary flow include:
means capable of carrying out an operation of marking said nominal audiovisual sequence so as to determine the marked audiovisual sequence having a marked content;
means capable of determining a difference between, on the one hand, said marked content and on the other hand, said modified content or said nominal content;
means capable of generating said marked complementary digital information as a function of said difference.

BRIEF DESCRIPTION OF DRAWINGS

Several embodiments of the invention will now be described while referring to the appended Figures wherein.

In the Figures, identical references refer to similar technical elements except otherwise indicated hereinunder.

DETAILED DESCRIPTION

Figure 1:
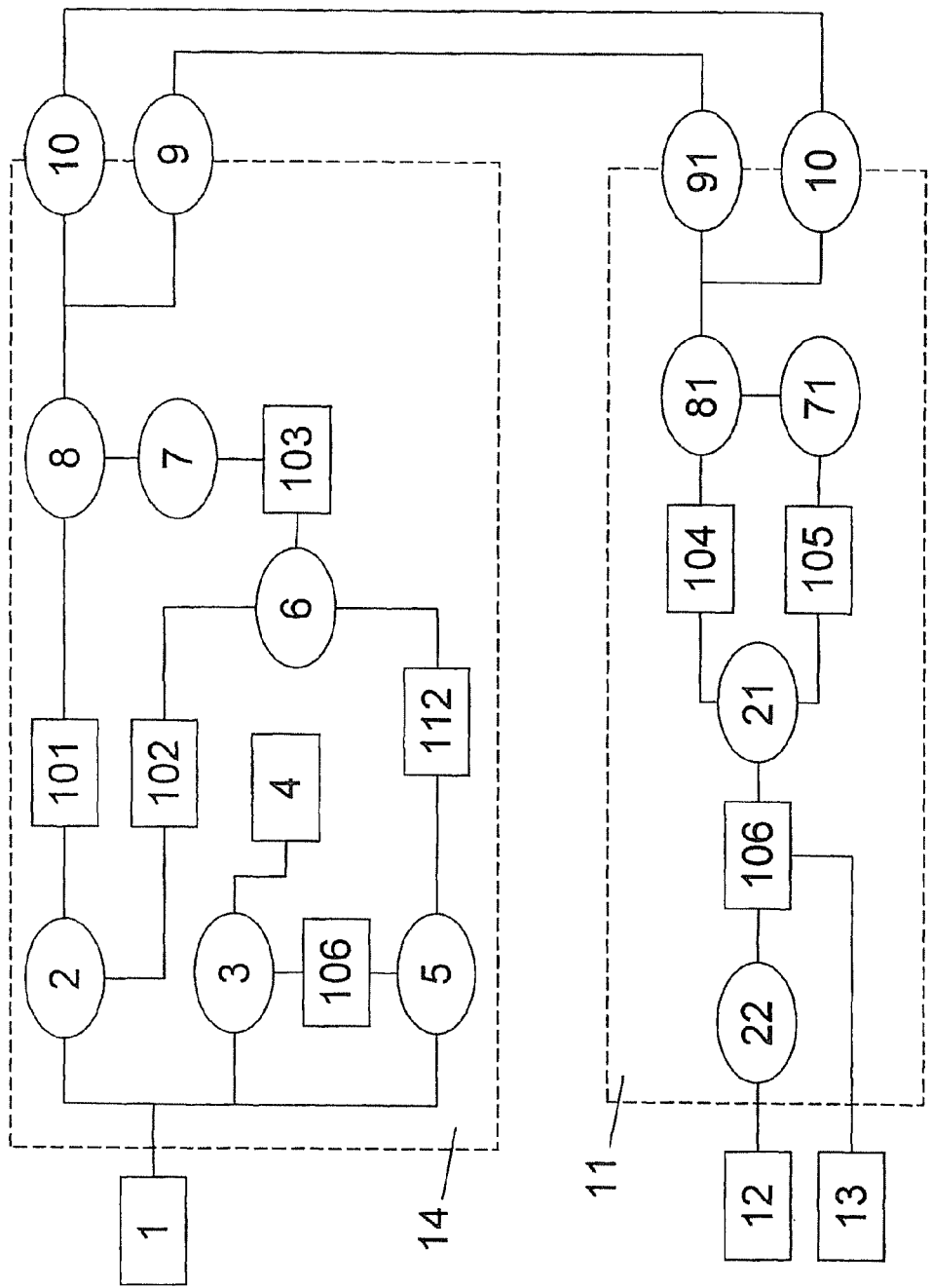
FIG. 1 illustrates the global architecture of a system for the implementation of a method according to a first embodiment of the invention.

An embodiment of the invention will now be described while referring to the appended FIG. 1 which illustrates the global architecture of a system for implementing the method according to the invention. In FIG. 1, an audiovisual content 1 undergoes two main operations in a server equipment 14. The initial digital audiovisual flow 1 is sent to an analyzing device 2 which uses the characteristics of the audiovisual encoding format of the initial audiovisual flow 1 to determine a modified main flow 101 and complementary digital information 102. The modified main flow 101 has the same format as the initial flow 1 but underwent some modifications in certain parameters, thus being legible on a standard player of this format, but the display of the corresponding audiovisual content is not correct as regards human perception. In the case of the digital audiovisual standard MPEG, the modifications brought to the initial flow 1 can be: a substitution of some DCT coefficients in certain blocks, a substitution of information on the movement compensation, a substitution of the order of scanning the coefficients of some images, etc. In this case, the complementary information 102 thus extracted represent only about 1% of the data of the modified main flow 101 to jam almost totally, visually and/or aurally the original digital audiovisual flow 1.

The modifications brought and the original information replaced, if any, in the modified main flow 101 are stored in the complementary digital information 102. The complementary information 102 can thus include data (for example coefficients describing the original digital flow or extracts from the original flow) and functions (for example the substitution or permutation function). A function is defined as containing at least one instruction linking data and operators. The complementary digital information 102 describe the operations to be carried out to restore the original flow from the modified flow.

The complementary information 102 and the modified main flow 101 can be generated as in the application WO 2004/015996.

Within the scope of the second step of analysis, the initial audiovisual flow 1 is sent to a tattooing device 3 for determining a tattooed and customized audiovisual flow 106 with the information from a user managing system 4. The customization information originating from the system 4 is supplied as an input to the tattooing device 3. The tattooed audiovisual flow 106 is customized for each client or each transaction which includes the sending of information giving the client device 11 access to the content.

The retrieving device 5 determines tattooing information 112 by comparing the tattooed audiovisual flow 106 and the initial audiovisual flow 1 at the bit level. The tattooing information 112 contain the part of the tattooed audiovisual flow 106 which is different from the initial audiovisual flow 1. The format of the tattooing information 112 is the same as that of the complementary information 102.

The tattooing information 112 can include data (for example coefficients describing the original digital flow or extracts from the original flow) and functions (for example, the substitution or permutation function). A function is defined as containing at least one instruction linking data and operators. Said tattooing information describe the operations to be carried out for restoring the tattooed audiovisual flow from the original flow. The tattooing information can be customized for each transaction. When the tattooing information inserted into said original flow, the identification of the transaction is possible even though the restored flow is submitted to hacking attempts of the recoding or analogical capture types.

Tattooed complementary information 103 are determined by a composition device 6 by combining the tattooing information 112 with the complementary information 102. The composition device 6 first copies the complementary information 102 into the tattooed complementary information 103, then it inserts the tattooing information 112 into the tattooed complementary information 103. In the case where the tattooing information 112 and the complementary information 102 contain references to the same part of the initial audiovisual content 1, the data relating to said references in the complementary information 102 will be replaced with those of the tattooing information 112 in the tattooed complementary information 103.

The tattooed complementary information 103 can include the assembly composed of the complementary information 102 and the tattooing information 112. The digital format of the three types (complementary, tattooing and tattooed complementary) of information is identical, which makes it impossible to separate the complementary information 102 from the tattooing information 112, when the tattooed complementary information 103 are generated. This functionality offers an important advantage: the separation of the two processes (that of restoring the original flow and that of the tattooing) becomes impossible, even for a client station comprised further to a successful hacking attempt.

The transmission of the tattooed complementary information 103 to the audiovisual decoder 11 is made secure by one of the protection systems 7 which is well known to the persons skilled in the art. Tattooed complementary information 103 are transmitted via the diffusion and transmission network 10 upon or prior to the viewing of said digital audiovisual program 1, or the tattooed complementary information 103 are packed with the greatest part of the modified main flow 101 by the packing device 8 by being for example added to the complementary data or metadata of the file including the modified main flow 101. A user having the receiving item of equipment 11 at home can play any audiovisual content originating from the telecommunication network 10 or originating from the physical media player 91. When he or she wishes to view the modified audiovisual flow 101, he or she cannot do it but by restoring the complementary digital information 102.

A de-multiplexer 81 transmits, on the one hand, the modified main flow 101 to the buffer memory 104 and on the other hand, the tattooed complementary information 102 protected are sent to a de-protecting module 71 which is compatible with the protection system 7. The de-protection module 71 transmits the tattooed complementary information 102 as a plaintext to a buffer memory 105 while respecting the restrictions imposed by the protection system 7. A synthesis device 21 retrieves on the fly the tattooed audiovisual flow 106 from both buffer memories 104 and 105 containing the synchronized parts of the modified audiovisual flow 101 respectively of the tattooed complementary information 103. The tattooed audiovisual flow 106 is identical with the modified audiovisual flow 101 as regards the audiovisual result, but it contains an invisible mark which can be detected by means well known to the persons skilled in the art. The tattooed audiovisual flow 106 is decoded by the audiovisual decoder 22 and it is rendered to the consumer using the rendering device 12. Advantageously, the tattooed flow is sent to a recording module 13 to make a private copy of the content onto a physical medium such as a DVD, a CD or memory card.

The general principle of a securing method for an audiovisual flow is described hereinafter. The aim is to authorize the audiovisual on demand and pay per view services through all the diffusion networks and the local recording into the memory of the digital decoding box of the user, the decoding box 11 can be a decoder connected to a TV set, a personal computer of the PC or MAC types, a handheld terminal of a telephone or a personal assistant of the PDA type 12. The solution consists in tattooing using one or several tattooing algorithms, the complementary information 102 which is represented by a small part of the audiovisual program 1, this part being most important to listen to and/or view said audiovisual program 1 on a screen, but having a very small volume with respect to the total volume of the digital audiovisual program 1 which will be free for distribution and copying.

Said tattooed complementary information 103 of the audiovisual program 1 are composed of the complementary information 102 which enable the restoration of the original flow 1 from the modified flow 101, and the tattooing information 112, which make it possible to mark in an invisible and inaudible way the content, as well as the digital or analogical fraudulent copy of said a tattooed content 106 enable the traceability of the malevolent user by analyzing said tattooing information 112. The modified main flow 101 is freely distributed to the users and between the users in a physical way on any storage medium 9 of the memory cards, CD, DVD, external peripheral unit types. The modified main flow 101 can be played on a conventional playing device 91 of this medium type, of the CD-ROM and/or DVD player, memory card player kinds.

According to an alternative solution, the modified main flow 101 is transmitted via a conventional telecommunication or diffusion network 10. Tattooed complementary information 103 are sent upon request via a narrow band telecommunication network 10 such as the conventional telephone networks and or cellular networks such as the GSM, GPRS or UMTS types or by using a small part of a network of the DSL or BLR types or then by using a sub-assembly of the shared bandwidth on a wire or satellite network. Thus, the user never has the integral original audiovisual flow 1 in a non protected digital form on his or her equipment and thus cannot reproduce it in an illegal way. At worst, the user can have access to the de-protected, but tattooed, audiovisual content, which enables the traceability of the fraudulently distributed and used copies.

According to a particular embodiment, the consumption of an audiovisual content is submitted to digital rights. Digital rights represent the information which indicate the conditions under which the content can be consumed: (a) the number of the consumptions of the content, (b) the validity date from which the content can be used, (c) the expiration date from which the content can no longer be consumed, (d) other types of rights such as the domain for which the consumption is authorized, the type of the decoder 22 which enables the consumption, etc. Advantageously, digital rights on the consumption of the main digital flow are recorded by the protection system 7 in the protected tattooed complementary information 103 transmitted to the multiplexer 8. Tattooed complementary information 103 as well as the modified main flow 101 can thus indifferently reach the receiving item of equipment 11, together or separately, through the communication network 10 or via a physical medium 9 which is played by the player 91 of the receiving item of equipment 11.

Figure 2:
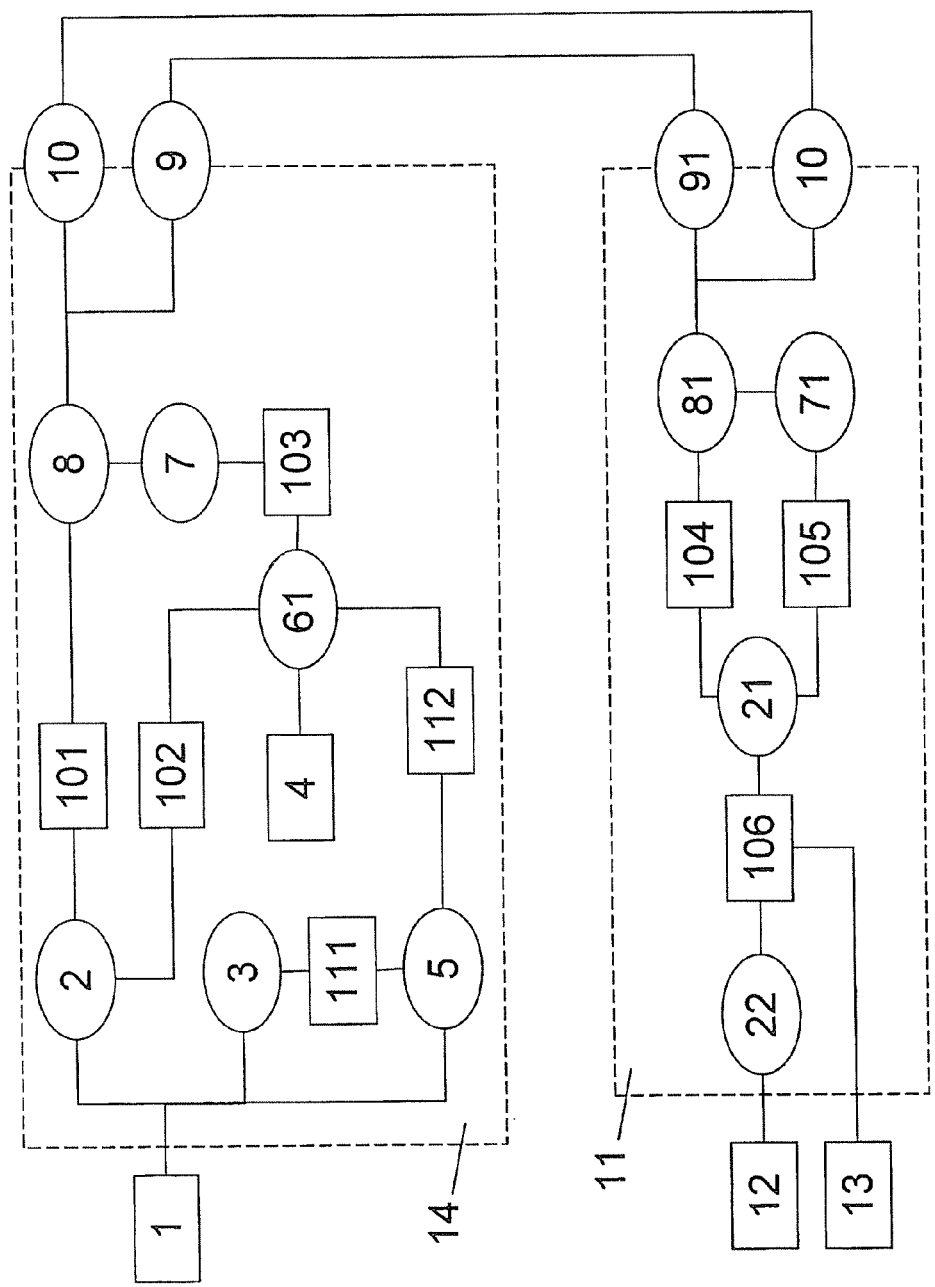
FIG. 2 illustrates the global architecture of a system for implementing a method according to a second embodiment of the invention.

In a second exemplary embodiment referring to the appended FIG. 2, a tattooed audiovisual flow 111 is marked in a generic way, the customization of the tattooed flow which requires the connection to the users managing system 4 being postponed to the following step. In this second exemplary embodiment, the composition device 61 extends the functionality of the composition device 6 by providing an additional step applied prior to the execution of the functions of the composition device 6, a step which consists in customizing the tattooed information 112 with information from a user managing system 4.

Figure 3:
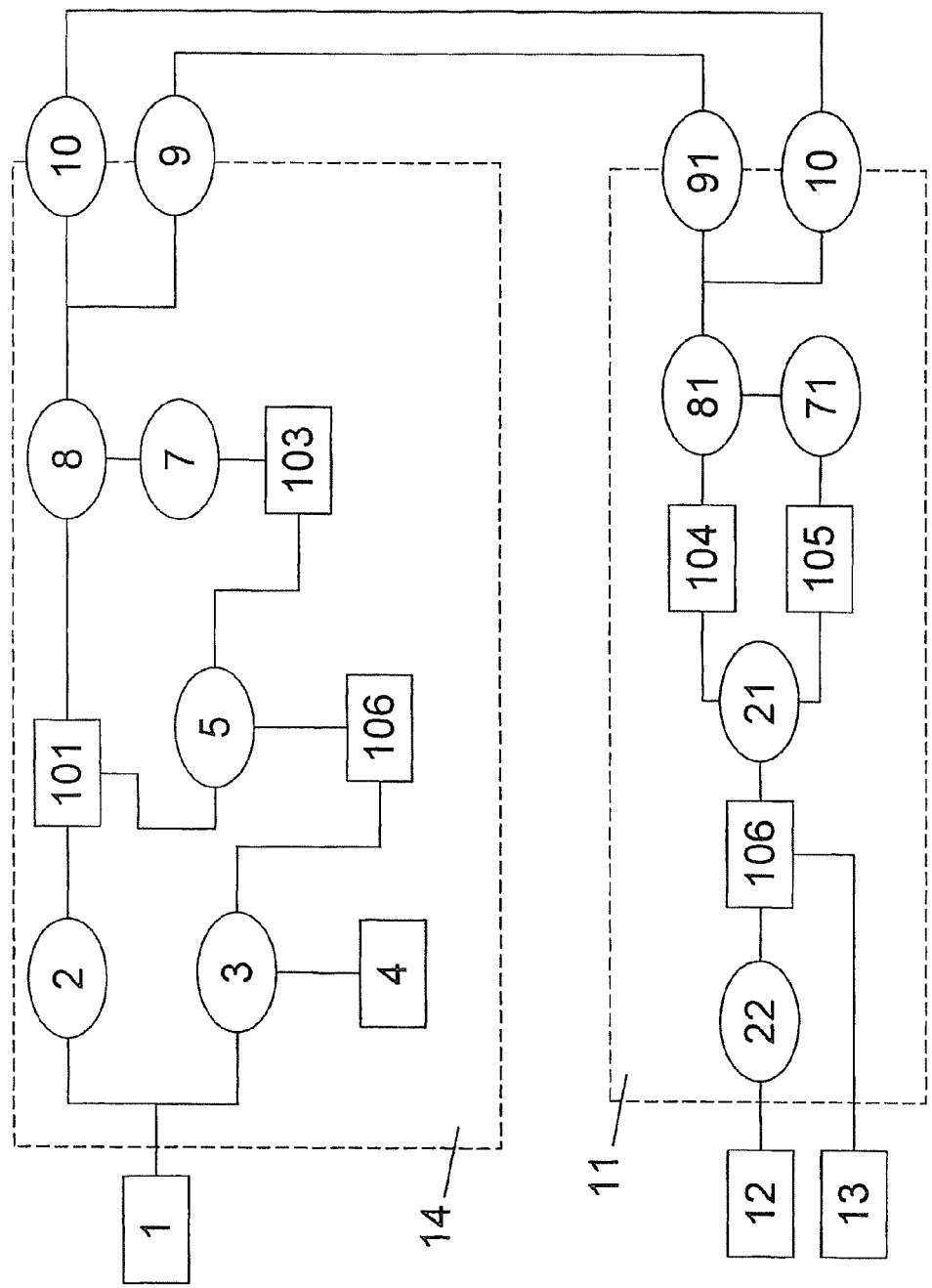
FIG. 3 illustrates the global architecture of a system for implementing a method according to a third embodiment of the invention.

In a third exemplary embodiment referring to the appended FIG. 3, the extraction device 5 determines tattooed complementary information 103 by comparing the tattooed audiovisual flow 106 and the modified main flow 101 at the bit level. Tattooed complementary information 103 contain the part of the tattooed audiovisual flow 106 which is different from the modified main flow 101.

In the three above-mentioned embodiments, the tattooed audiovisual flow 106 which is restored at the level of the receiving item of equipment 11 is customized as a function of the receiving item of equipment 11, one of the users thereof or one identifier of the tattooing operation, through the user managing system 4. However, the invention can be implemented without this customization so long as the audiovisual content 1 is marked with identifiable information for example a tattoo.

The invention claimed is:

1. A method for distributing a marked audiovisual sequence from a nominal audiovisual sequence to a receiving item of equipment, the nominal audiovisual sequence having a nominal content, the method comprising:
    (a) generating, by a first generator, a first modified flow having a modified content different from the nominal content;
    (b) generating, by a second generator, a second marked complementary flow including marked complementary digital information; and
    (c) transmitting, by a transmitter, the first modified flow and the marked complementary information to the receiving item of equipment so as to allow a restoration of the marked audiovisual sequence at the receiving item of equipment;
    wherein generating the second marked complementary flow, further includes:
        (i) carrying out a marking operation on the nominal audiovisual sequence so as to determine a marked audiovisual sequence having a marked content; and
        (ii) determining a difference between the marked content on the one hand and the modified content or the nominal content on the other hand;
        (iii) wherein the marked complementary digital information depends on the difference.

2. A method according to claim 1, wherein determining a difference between the marked content and the nominal content further comprises:
    generating a second modified complementary flow including complementary digital information able to allow the restoration of the nominal content from the modified content; and
    determining marking information in accordance to bit differences between the marked content and the nominal content;
    wherein the marked complementary digital information are determined as a function of the complementary information and the marking information.

3. A method according to claim 2, wherein the marking information, the complementary information and the marking complementary information have an identical format.

4. A method according to claim 1, wherein generating the marked complementary flow further comprises:
    generating a second modified complementary flow including complementary digital information able to allow the restoration of the nominal content from the modified content; and
    determining marking information so as to allow the restoration of the marked audiovisual sequence from the nominal audiovisual sequence,
    wherein the marking information is determined in accordance to the operation of marking the nominal audiovisual sequence;
    the marked complementary digital information is determined as a function of the complementary information and the marking information, and
    the marking information, the complementary information and the marked complementary information have an identical format.

5. A method according to claim 1, wherein determining a difference between the marked content and the modified content further comprises:
    comparing the marked content and the modified content at a bit level so as to determine the difference.

6. A method according to claim 1, wherein the marked complementary information include a customization identifier.

7. A method according to claim 6, wherein the customization identifier includes a single identifier of the receiving item of equipment.

8. A method according to claim 6, wherein the customization identifier includes a single identifier of a user of the receiving item of equipment.

9. A method according to claim 6, wherein the customization identifier includes a single identifier of the marking operation.

10. A method according to claim 1, wherein the marked complementary information include a tattoo, so that the marked content is visually and aurally identical with the nominal content.

11. A method according to claim 1, wherein the marked complementary information include information relating to the digital rights associated with the nominal audiovisual sequence.

12. A method according to claim 1, wherein the nominal audiovisual sequence has a nominal format and wherein the modified content has a format identical with the nominal format.

13. A system for distributing a marked audiovisual sequence from a nominal audiovisual sequence to a receiving item of equipment, the nominal audiovisual sequence having a nominal content, the system comprising:
    (a) a first generator operably generating a first modified flow having a modified content different from the nominal content;
    (b) a second generator operably generating a second marked complementary flow including marked complementary digital information; and (c) a transmitter operably transmitting to the receiving item of equipment the first modified flow and the marked complementary information, so as to allow a restoration of the marked audiovisual sequence at the receiving item of equipment;

wherein the second generator operably generating a second marked complementary flow further includes:
  (i) a marker operably marking the nominal audiovisual sequence, so as to determine a marked audiovisual sequence having a marked content; and
  (ii) at least one of a retrieving device, a composition device and an extraction device operable to determine a difference between the marked content, on the one hand, and the modified content or the nominal content, on the other hand; and
  (iii) wherein the composition device or an additional composition device is operable to generate the marked complementary digital information, as a function of the difference.

* * * * *